US011706018B2

(12) United States Patent
Beynel et al.

(10) Patent No.: US 11,706,018 B2
(45) Date of Patent: Jul. 18, 2023

(54) SYSTEM AND METHOD FOR MAINTAINING A DISTRIBUTED LEDGER

(71) Applicant: AMADEUS S.A.S., Biot (FR)

(72) Inventors: Mathieu Philippe Beynel, Pegomas (FR); Maxime Godeau, Biot (FR); Olivier Cazeaux, Juan les Pins (FR); Jeremy Teyssedre, Vallauris (FR)

(73) Assignee: AMADEUS S.A.S., Biot (FR)

( * ) Notice: Subject to any disclaimer, the term of this patent is extended or adjusted under 35 U.S.C. 154(b) by 477 days.

(21) Appl. No.: 16/716,869

(22) Filed: Dec. 17, 2019

(65) Prior Publication Data

US 2020/0195422 A1     Jun. 18, 2020

(30) Foreign Application Priority Data

Dec. 17, 2018 (FR) ...................... 1873072

(51) Int. Cl.
*G06F 5/01* (2006.01)
*H04L 9/06* (2006.01)
*G06F 9/54* (2006.01)
*H04L 9/00* (2022.01)

(52) U.S. Cl.
CPC ............ *H04L 9/0637* (2013.01); *G06F 9/546* (2013.01); *H04L 9/50* (2022.05); *H04L 2209/463* (2013.01)

(58) Field of Classification Search
CPC ............... H04L 9/0637; H04L 2209/38; H04L 2209/463; H04L 9/3239; H04L 9/3297; G06F 9/546; G06F 21/64; G06F 16/273; G06F 11/1471; G06F 11/187; G06F 9/467; G06F 16/178; G06Q 20/382; G06Q 10/02

See application file for complete search history.

(56) References Cited

U.S. PATENT DOCUMENTS

| 10,880,070 | B1 * | 12/2020 | Delaney | ................. H04L 9/3239 |
| 11,569,981 | B1 * | 1/2023 | Mishra | .................... G06F 21/64 |
| 2017/0323392 | A1 * | 11/2017 | Kasper | .................. H04L 63/123 |

(Continued)

OTHER PUBLICATIONS

Mazieres, David. "The stellar consensus protocol: a federated model for internet-level consensus." Stellar Development Foundation 32 (2015).

(Continued)

*Primary Examiner* — Timothy A Mudrick
*Assistant Examiner* — Abdou K Seye
(74) *Attorney, Agent, or Firm* — Perry + Currier

(57) ABSTRACT

A method of maintaining a distributed ledger at a client node includes: storing a distributed ledger defining a plurality of records each containing a set of values; storing (i) a local voting weight corresponding to the client node, and (ii) respective remote voting weights for a plurality of remote client nodes; obtaining a proposed update to a record of the distributed ledger; generating a local vote to apply or discard the proposed update and transmitting the local vote to the remote client nodes; receiving remote votes to apply or discard the proposed update from the remote client nodes; determining whether to permit the proposed update based on (i) the local vote and the local voting weight, and (ii) the remote votes and the corresponding remote voting weights; and according to the determination, applying the proposed update to the distributed ledger or discarding the proposed update.

24 Claims, 6 Drawing Sheets

(56) References Cited

U.S. PATENT DOCUMENTS

| | | | | |
|---|---|---|---|---|
| 2019/0238525 A1* | 8/2019 | Padmanabhan | ..... | H04L 63/0428 |
| 2019/0251556 A1* | 8/2019 | McCormick | ........ | G06F 16/2379 |
| 2019/0278852 A1* | 9/2019 | Jayachandran | ....... | G06F 16/182 |
| 2019/0340623 A1* | 11/2019 | Rivkind | .............. | G06F 16/2365 |
| 2020/0125750 A1* | 4/2020 | Hatami | ................ | H04L 63/123 |
| 2020/0137583 A1* | 4/2020 | Economy | .............. | H04W 16/10 |
| 2020/0142905 A1* | 5/2020 | Jain | ......................... | G06F 16/27 |
| 2020/0366495 A1* | 11/2020 | Mahoney | ............ | G06F 16/2379 |

OTHER PUBLICATIONS

Schwartz, David, et al . . . "The ripple protocol consensus algorithm." Ripple Labs Inc White Paper 5.8 (2014).
Cachin, Christian, et al . . . "Blockchain consensus protocols in the wild." arXiv preprint arXiv:1707.01873 (2017).
Wahab, Abdul, et al. "Survey of consensus protocols." arXiv preprint arXiv:1810.03357 (2018).
Rafailescu, Marius et al . . . "Fault tolerant consensus protocol for distributed database transactions." Proceedings of the 2017 International Conference on Management Engineering, Software Engineering and Service Sciences. 2017.

* cited by examiner

SYSTEM AND METHOD FOR MAINTAINING A DISTRIBUTED LEDGER

CROSS-REFERENCE TO RELATED APPLICATION

This application claims priority from French patent application no. 1873072, filed Dec. 17, 2018, the contents of which are incorporated herein by reference.

FIELD

The specification relates generally to distributed data storage, and specifically to a system and method for maintaining a distributed ledger.

BACKGROUND

Various systems, such as those configured to maintain travel data (e.g. flight status, booking, check-in data, passenger identification data and the like), are implemented by a plurality of distinct entities, each storing distinct subsets of the total volume of data operated on within the system. Typically, no single entity exerts control over the total volume of data. The above-mentioned subsets, however, may overlap with each other to varying degrees, and synchronization between entities may therefore be necessary. Such synchronization may be achieved via bi-directional requests and responses between each pair of entities, or via bulk exports and subsequent imports to transfer data between entities. The above mechanisms may be time-consuming, computationally intensive, or both.

SUMMARY

An aspect of the specification provides a method of maintaining a distributed ledger at a client node, comprising: storing a distributed ledger defining a plurality of records each containing a set of values; storing (i) a local voting weight corresponding to the client node, and (ii) respective remote voting weights for a plurality of remote client nodes; obtaining a proposed update to a record of the distributed ledger; generating a local vote to apply or discard the proposed update and transmitting the local vote to the remote client nodes; receiving remote votes to apply or discard the proposed update from the remote client nodes; determining whether to permit the proposed update based on (i) the local vote and the local voting weight, and (ii) the remote votes and the corresponding remote voting weights; and according to the determination, applying the proposed update to the distributed ledger or discarding the proposed update.

BRIEF DESCRIPTIONS OF THE DRAWINGS

Embodiments are described with reference to the following figures, in which.

DETAILED DESCRIPTION

Figure 1:
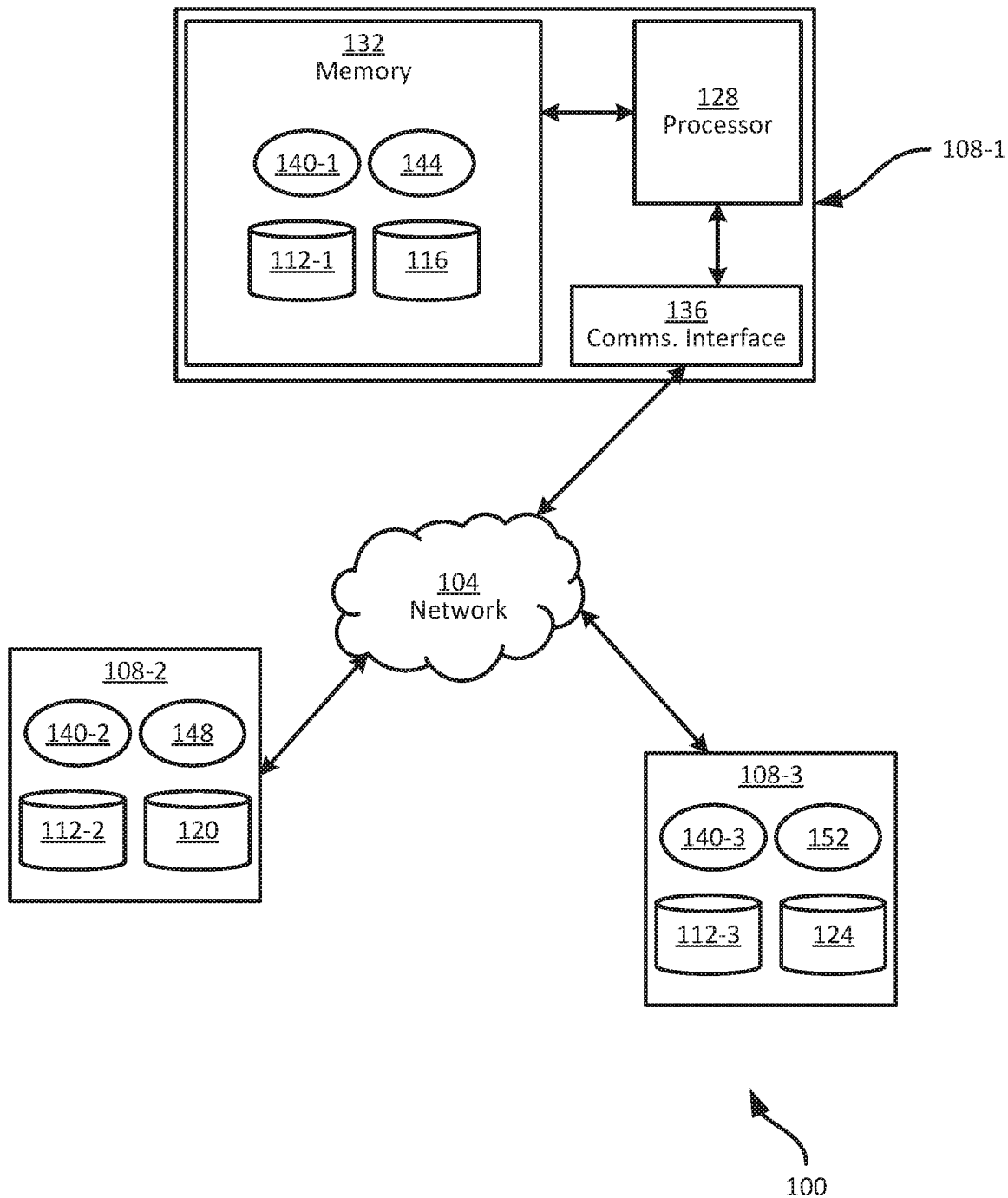
FIG. 1 depicts a system for maintaining a distributed ledger.

FIG. 1 depicts a system 100 for maintaining a distributed ledger (also referred to as Distributed Ledger Technology, or DLT). The system 100 includes a network 104, implemented as any suitable combination of local and wide-area networks (e.g. including the Internet), interconnecting a plurality of servers 108 (also referred to herein as nodes 108), of which three examples 108-1, 108-2 and 108-3 are shown. The servers 108 need not be implemented as individual servers 108, but rather are shown as individual servers 108 for clarity of illustration. For example, each server 108 may be implemented as a sub-system, including one or more further networks, a plurality of servers and other computing devices (not shown).

Each node 108 is typically, but not necessarily, operated by a distinct entity. In the examples discussed below, the system 100 is configured to maintain a distributed ledger containing travel data (e.g. flight bookings, passenger records, customer complaint tracking, and the like). It will be apparent to those skilled in the art, however, that the principles of operation implemented by the system 100 can be applied to a wide variety of other types of data, managed by any suitable combination of entities. In the present example, the node 108-1 is operated by an airline, while the node 108-2 is operated by a customer profile generation entity and the node 108-3 is operated by a complaint management entity.

As noted above, the nodes 108 are configured to maintain a distributed ledger containing travel data. Thus, each node 108 maintains a local copy 112-1, 112-2, 112-3 of the distributed ledger (collectively referred to simply as the ledger 112). Each node 108 may initiate updates to the ledger 112, and the nodes 108 are configured to implement a voting-based consensus mechanism for determining whether to apply or reject (i.e. discard) each proposed update to the ledger 112. In contrast to conventional voting-based consensus mechanisms, however, as will be discussed below each node 108 can be assigned a distinct voting weight, giving the node 108 more or less influence than the other nodes 108 over whether proposed updates to the ledger 112 are accepted.

Each node 108 may also store data that is maintained outside the ledger 112, and thus resides only on one node 108. For example, the node 108-1 (e.g. operated by an airline in the present example) can contain listings of operating crew members for each of a plurality of flights, while neither of the nodes 108-2 and 108-3 contain such crew information. Various other types of data can be maintained within or outside the ledger 112, including, for example, boarding status for passengers registered for a given flight. Data maintained outside the ledger 112 (i.e. data that is accessed by only a single node 108) is also referred to herein as private data. In some embodiments, the private data may in fact be maintained within the ledger 112, with access restricted to a subset of the nodes 108 via encryption of portions of the ledger 112. In the present example, the private data is illustrated as being maintained separately from the ledger 112. Thus, the node 108-1 maintains a private repository 116, the node 108-2 maintains a private repository 120, and the node 108-3 maintains a private repository 124. The voting weight assigned to a given node 108 may depend on the content of the private data maintained by that node 108.

Before discussing the functionality implemented by the nodes 108 of the system 100 to maintain the ledger 112, certain internal components of the node 108-1 will be discussed, with the understanding that the nodes 108-2 and 108-3 include equivalent (though not necessarily identical) components.

The node 108-1 includes at least one processor 128, such as a central processing unit (CPU) or the like. The processor 128 is interconnected with a memory 132, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 128 and the memory 132 are generally comprised of one or more integrated circuits (ICs).

The processor 128 is also interconnected with a communications interface 136, which enables the node 108-1 to communicate with the other computing devices of the system 100 (including the nodes 108-2 and 108-3) via the network 104. The communications interface 136 therefore includes any necessary components (e.g. network interface controllers (NICs), radio units, and the like) to communicate via the network 104. The specific components of the communications interface 136 are selected based on upon the nature of the network 104. The node 108-1 can also include input and output devices connected to the processor 128, such as keyboards, mice, displays, and the like (not shown).

The components of the node 108-1 mentioned above can be deployed in a single enclosure, or in a distributed format. In some examples, therefore, the node 108-1 includes a plurality of processors, either sharing the memory 132 and communications interface 136, or each having distinct associated memories and communications interfaces.

The memory 132 stores the local copy 112-1 of the ledger 112 mentioned above, as well as the private data repository 116. The memory 132 also stores a plurality of computer-readable programming instructions, executable by the processor 128, in the form of various applications, including distributed ledger client application 140-1 and a vote generation application 144. As will be understood by those skilled in the art, the processor 128 executes the instructions of the applications 140-1 and 144 (and any other suitable applications) in order to perform various actions defined by the instructions contained therein. In the description below, the processor 128, and more generally the node 108-1, are said to be configured to perform those actions. It will be understood that they are so configured via the execution (by the processor 128) of the instructions of the applications stored in memory 132. The nodes 108-2 and 108-3 store distributed ledger client applications 140-2 and 140-3, as well as vote generation applications 148 and 152, respectively.

Execution of the client applications 140, as will be discussed below, configures each respective node 108 to exchange proposed updates to the ledger 112 with the other nodes, as well as to coordinate the exchange of votes with the other nodes and manage the application of changes to the ledger 112 (e.g. when the votes exchanged between the nodes 108 indicate that a proposed update is to be applied to the ledger 112). The votes themselves are generated at each node 108 via execution of the corresponding vote generation application. Thus, the node 108-2, for example, executes the vote generation application 148 to generate votes (for accepting or rejecting an update). As indicated by the reference numbers applied to the vote generation applications 144, 148 and 152 in comparison to the client applications 140, the functionality of the client applications 140 is substantially identical at each node, whereas the functionality implemented by the vote generation application 144 need not be identical to that of either the applications 148 and 152. In other words, the nodes 108 each implement a common process (dictated by the applications 140) for exchanging proposed updates and votes on such updates, but may each implement distinct algorithms for determining the actual votes. Vote generation at each node 108 may therefore rely at least in part on the private data of the node 108, and may be performed according to algorithms that are not known to the other nodes 108.

Figure 2:
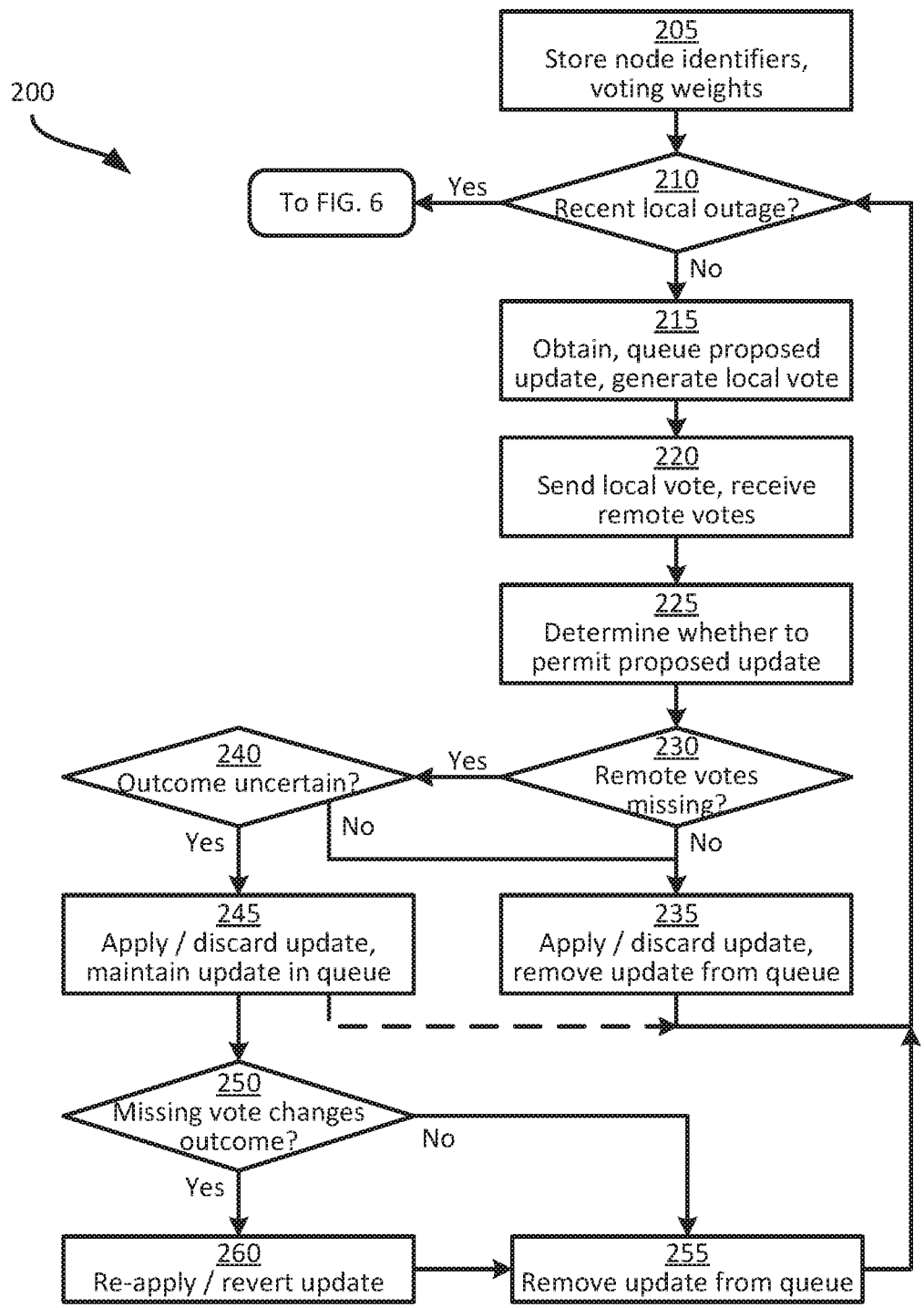
FIG. 2 depicts a method for maintaining a distributed ledger.

Turning now to FIG. 2, certain aspects of the operation of the system 100 will be described in greater detail. Specifically, FIG. 2 illustrates a method 200 of maintaining the ledger 112. The method 200 will be described in conjunction with its performance within the system 100, and specifically by each of the nodes 108 via execution of the DLT client applications 140 and the vote generation applications 144, 148 and 152. That is, the method 200 is performed in parallel by each node 108 in the system 100.

At block 205, the node 108 is configured to store node identifiers and voting weights for every node 108 in the system 100. Thus, the node 108-1 stores node identifiers and voting weights both for itself (referred to as a local voting weight) and for the nodes 108-2 and 108-3 (referred to as remote voting weights). Node identifiers can include network addresses (e.g. any suitable combination of IP addresses, port numbers, domain identifiers and the like), or any other identifiers suitable for establishing communications with the nodes 108 over the network 104. The voting weights, as will be discussed below, define the degree of influence each node 108 has over decisions to apply or discard proposed updates to the ledger 112. Table 1 illustrates an example set of node identifiers and corresponding voting weights.

TABLE 1

Example node identifiers and voting weights

| Node ID | Voting Weight |
|---|---|
| 108-1 | 40% |
| 108-2 | 45% |
| 108-3 | 15% |

As will now be apparent, each node 108 stores the above data. The node identifiers and voting weights as stored at each node 108 may contain indications of which record represents local data and which nodes represents remote data. The voting weights are expressed as percentages above, but may be expressed in a variety of other formats in other examples.

Voting weights and node identifiers are exchanged by the nodes 108 during deployment of the system 100. The voting weights are predefined, and are typically static (although in some instances it may be desirable to reconfigure the system 100, for example to deploy an additional node 108, necessitating updating of the voting weights). The voting weights may be selected according to any of a wide variety of criteria. For example, a node 108 may be assigned a greater voting weight according to the breadth of the private data stored by that node. In other embodiments, each node may be assigned more than one voting weight. Each voting weight for a given node can correspond to a type of update to the DLT 112. For example, for insertions of new data into the DLT 112, a given node may have a first weight, while for edits of existing data in the DLT 112, the same node may have a second weight different from the first weight. In further examples, the distinct weights assigned to a given node can correspond to particular fields, values or the like in the DLT 112. For example, a node operated by an airline may have a first weight for use in connection with any updates to flight times defined in the DLT 112, and a second weight (e.g. a smaller weight) for use in connection with any updates to contact information for a passenger.

At block 210, the node 108 is configured to determine whether a local outage has occurred that may require a recovery process to obtain updates to the ledger 112 that have not been received. A local outage, as referred to herein, is any condition or set of conditions preventing a node 108 from exchanging data with the other nodes 108. Thus a loss of connectivity, planned or unplanned downtime (e.g. for maintenance) and the like are all examples of a local outage. In brief, following a local outage the node 108 is configured to retrieve updates that occurred amongst the other nodes 108 during the local outage, and to evaluate the updates according to a method to be discussed below in connection with FIG. 6.

When the determination at block 210 is negative, the performance of the method 200 proceeds to block 215. At block 215, the node 108 is configured to obtain a proposed update to the ledger, and to store the proposed update in a queue (e.g. in the memory 132) pending further processing. Obtaining a proposed update includes either receiving the proposed update from another node 108 via any suitable DLT synchronization mechanism (implemented by the client application 140), or generating the proposed update locally (in which case the proposed update is also circulated to the other nodes 108, for receipt at parallel performances of block 215 within those nodes 108).

At block 215, the node 108 is also configured to generate a local vote corresponding to the proposed update. Generation of a local vote by each node 108, as noted earlier, can be performed according to any suitable criteria, which need not be shared between nodes 108.

Figure 3A:
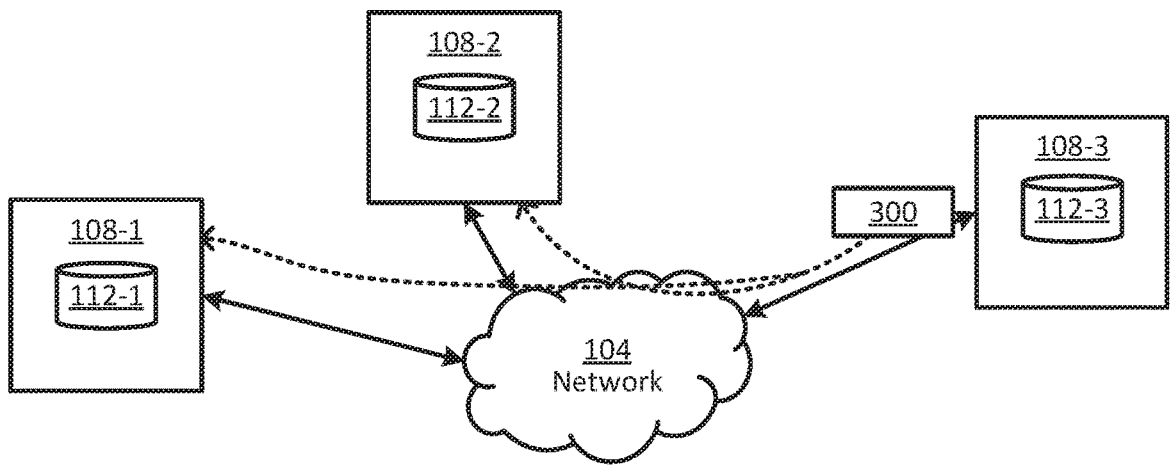
FIGS. 3A-3C depict a performance of the method of FIG. 2.
Figure 3B:
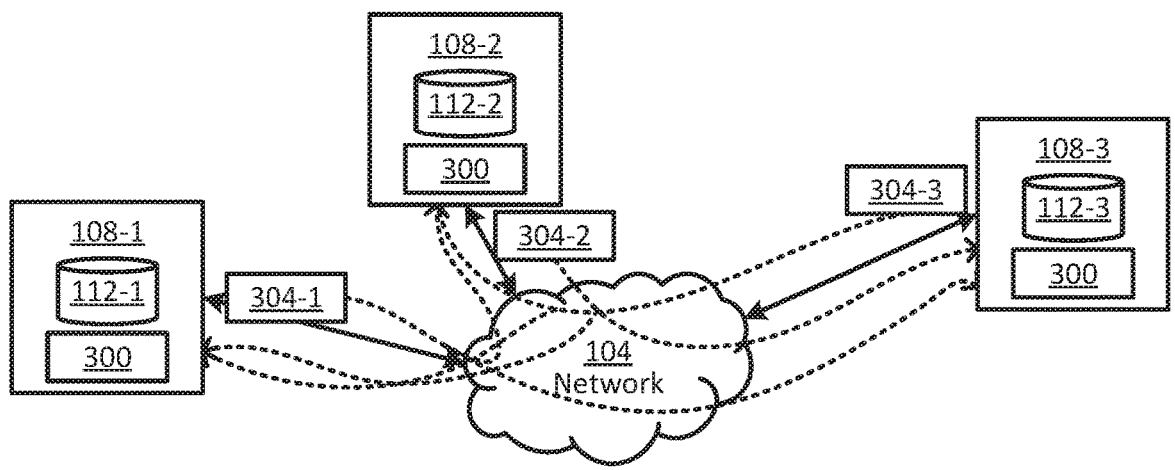
Figure 3C:
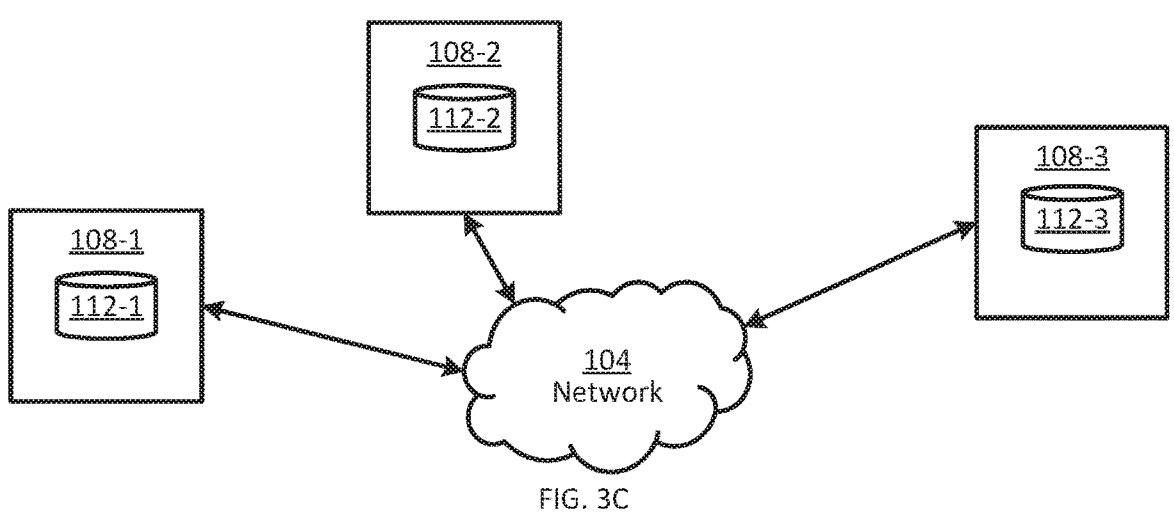

At block 220, the node 108 is configured to transmit the local vote generated at block 215 to the other nodes 108, and to receive votes (referred to as remote votes) on the proposed update obtained at block 215 from the other nodes 108. That is, the other nodes 108, having also obtained the proposed update via respective performances of block 215, are also configured to generate local votes and transmit the local votes via respective performances of block 220. FIGS. 3A and 3B illustrate example performances of blocks 215 and 220. Specifically, FIG. 3A illustrates a proposed update 300 originating at the node 108-3, such as a proposed update to log a flight service complaint in connection with a given passenger record (e.g. defined by a passenger name or other suitable identifier). The proposed update 300 is propagated to the nodes 108-1 and 108-2, as indicated by the dashed lines.

FIG. 3B illustrates the generation and exchange of votes at block 220. Specifically, each node 108 generates a respective vote 304-1, 304-2, and 304-3, and transmits the vote 304 to the other two nodes 108. For instance, the vote 304-3 is assumed to be affirmative (because the node 108-3 initiated the proposed update). The votes 304-1 and 304-2, however are negative in the present example. For example, the node 108-1 may be configured to determine whether the passenger name associated with the proposed update is associated with a flight booking. When the determination is negative, the node 108-1 may be configured to vote against application of the update (e.g. because a flight service complaint is not likely to be valid when the corresponding passenger has not booked any flights). The vote 304-2 generated by the node 108-2, meanwhile, is also negative in the present example. For instance, the node 108-2 may be configured to determine whether the passenger name associated with the proposed update has checked in to any flights. Given that the passenger has not booked any flights, the determination is negative.

Returning to FIG. 2, at block 225, following a predefined time period, each node 108 is configured, based on the local vote generated at block 215 and the remote votes received at block 220, to determine whether to permit the proposed update. The determination at block 225 comprises summing the votes in favour of applying the update and the votes against applying the update, weighted according to the voting weights discussed in connection with block 205, and determining whether the majority of the weighted vote is for applying or discarding the proposed update. Table 2 below illustrates an example outcome of the update mentioned above in connection with FIGS. 3A and 3B.

TABLE 2

Example Votes and Outcome

| Node ID | Voting Weight | Vote | Outcome |
| --- | --- | --- | --- |
| 108-1 | 40% | Discard | 85/100 Discard |
| 108-2 | 45% | Discard | |
| 108-3 | 15% | Approve | |

As seen above, the majority of the weighted vote is to discard the proposed update. Although all three nodes 108 have generated votes to either discard or approve the proposed update in the example above, in other examples a third type of vote may be generated by one or more nodes 108. In particular, the vote generation algorithms applied by a node 108 may specify that the node 108 lacks sufficient information to generate a vote to apply or discard updates to certain records or fields in the ledger. For example, the node 108-3 may lack sufficient information to vote for applying or discarding updates to flight prices in the ledger 112. The application 152 may therefore specify that for updates to the price field of a record defining a flight, the node 108-3 will generate an abstaining vote (also referred to as a blank vote). The weighted vote under such conditions omits the weight of the node 108-3, and is therefore assessed out of a total weight of 85 rather than 100.

At block 230, each node 108 is configured to determine whether any votes are missing. That is, each node 108 is configured to determine whether the remote votes received at block 220 represent a complete set of votes. When the voting record assembled from blocks 215 and 220 is incomplete, indicating that one or more votes were not received within the time period mentioned above (e.g. because one or more nodes 108 experienced an outage), the performance of the method 200 proceeds to block 240, discussed further below. In the present example, however, votes were received from each node 108, and the determination at block 230 is therefore negative (i.e. no votes were missing when the determination at block 225 was made). The node 108 therefore proceeds to block 235, at which the proposed update is applied to the ledger 112 or discarded, according to the outcome of block 225. In the present example, referring to FIG. 3B, the outcome of block 225 is that the proposed update is discarded. Therefore, the proposed update 300 is removed from the queue at each node 108, and the local copies 112 of the ledger remain unchanged. In other examples, the local copies 112 of the ledger 112 are updated to store the proposed update, along with an indication that the proposed update was discarded. Thus, the ledger 112 maintains a history of all proposed updates, including those that were rejected. Each node then returns to block 210.

As noted above, when the determination at block 230 is affirmative, indicating that votes were not received from all nodes 108 within the time period mentioned in connection with block 225, each node 108 proceeds to block 240. As will now be apparent, although the method 200 is described above as being performed in parallel by each node 108, an affirmative determination at block 230 typically indicates that one or more nodes 108 have suffered an outage, and those nodes 108 therefore may not be performing the method 200 (e.g. as a result of not having received the update at block 215).

At block 240, the remaining nodes 108 (i.e. those not affected by an outage) are each configured to determine, based on the votes received at blocks 215 and 220, whether the outcome determined at block 225 is uncertain. An uncertain outcome is one that could be reversed by a missing vote, were the missing vote present. For example, Table 3 lists a set of votes, in which no vote has been received from the node 108-3. However, because the nodes 108-1 and 108-2, which together represent 85% of the total weighted vote, both generated local votes in favour of applying the proposed update, the determination by the nodes 108-1 and 108-2 at block 225 (to apply the update) is not uncertain, because no vote from the node 108-3 could alter the determination from block 225.

TABLE 3

Example Votes and Outcome

| Node ID | Voting Weight | Vote | Outcome |
|---|---|---|---|
| 108-1 | 40% | Approve | 85/85 Approve |
| 108-2 | 45% | Approve | |
| 108-3 | 15% | N/A | |

Figure 4A:
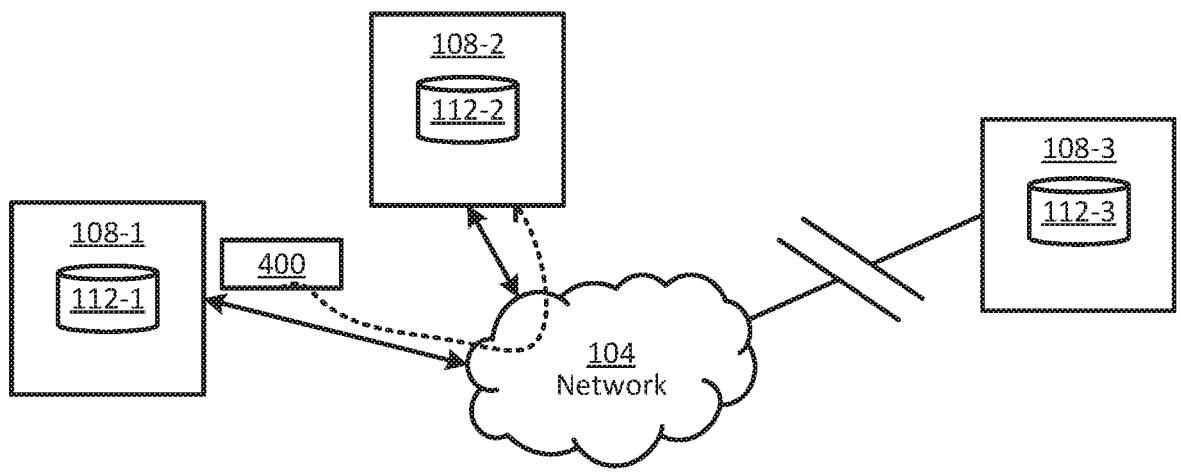
FIGS. 4A-4C depict a further performance of the method of FIG. 2.
Figure 4B:
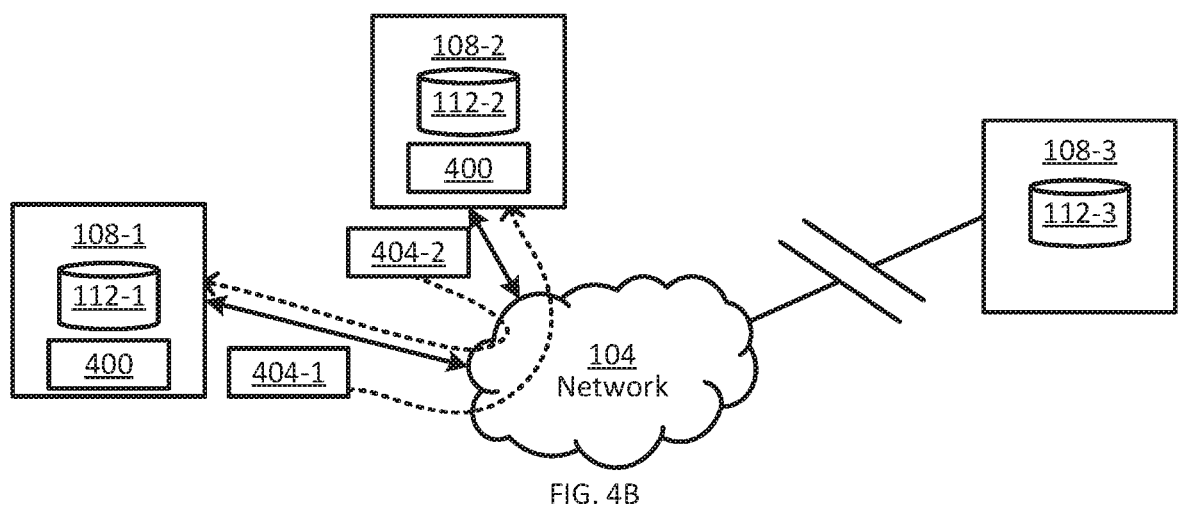
Figure 4C:
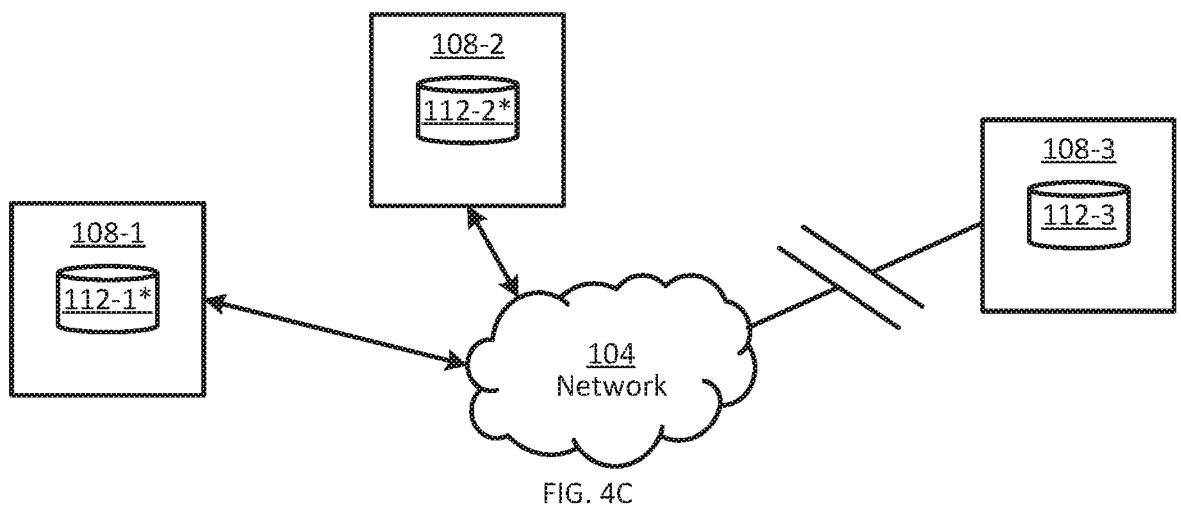

The determination at block 240 is therefore negative in the present example, and the nodes 108-1 and 108-2 each proceed to block 235, as discussed above. FIGS. 4A-4C illustrate the above process. In particular, FIG. 4A depicts a proposed update 400 generated by the node 108-1. However, the node 108-3 is not connected to the network 104, and therefore does not receive the proposed update 400. Thus, as shown in FIG. 4B, the nodes 108-1 and 108-2 exchange votes 404-1 and 404-2, but no vote is received from the node 108-3. Finally, as shown in FIG. 4C, the local copies 112-1 and 112-2 of the ledger 112 are updated (appearing as 112-1* and 112-2*), and the proposed update 400 is removed from the queue at the nodes 108-1 and 108-2, but the local copy 112-3 of the node 108-3 remains unchanged.

Figure 5A:
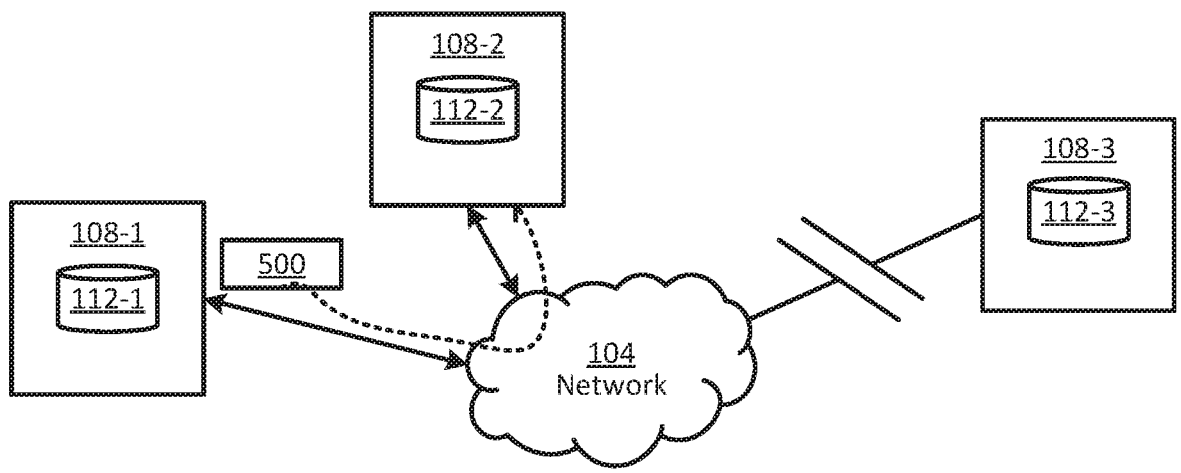
FIGS. 5A-5C depict another performance of the method of FIG. 2.
Figure 5B:
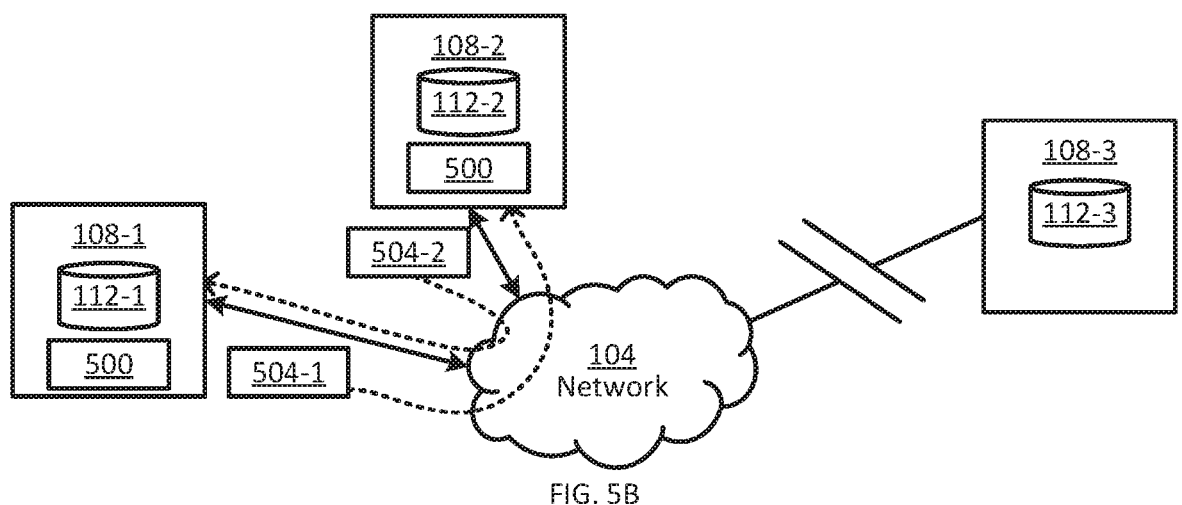
Figure 5C:
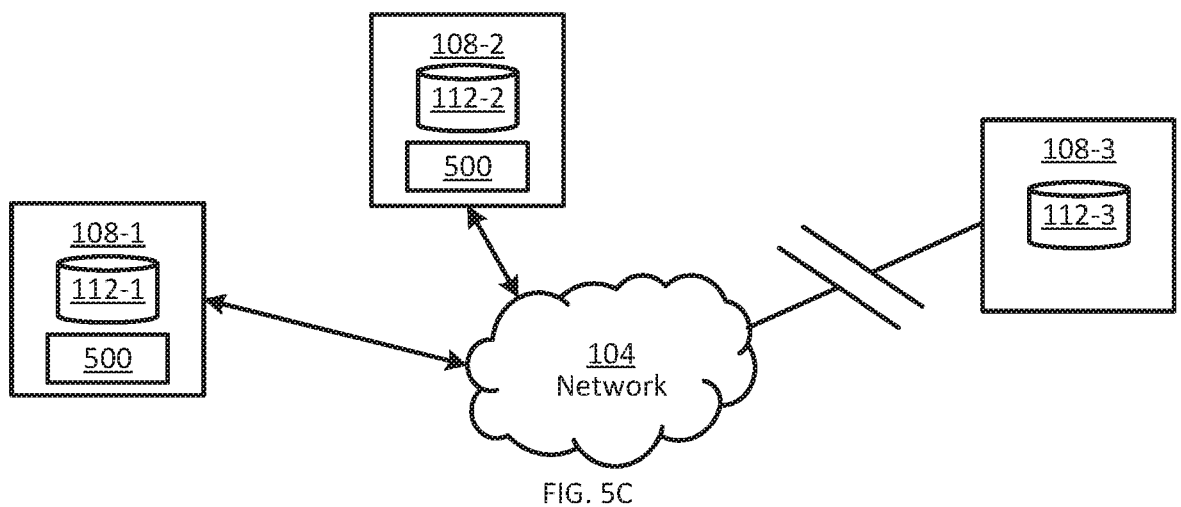

A further example is illustrated in FIGS. 5A-5C. In particular, as shown in FIG. 5A, a proposed update 500 originating at the node 108-1 does not reach the node 108-3. The nodes 108-1 and 108-2 therefore store the proposed update 500 in their respective queues, and exchange votes 504-1 and 504-2, but no vote is received from the node 108-3. Table 4 shows example voting weights and votes corresponding to FIGS. 5A-5B. In particular, the voting weight corresponding to the node 108-3 is 45%, while the weight assigned to the node 108-2 is only 15%. Therefore, following an affirmative determination at block 230, the determination at block 240 for each of the nodes 108-1 and 108-2 is affirmative. That is, the outcome shown below (discarding the proposed update 500 because the majority of the available weighted vote is to discard the update) is uncertain, because the weight corresponding to the node 108-3 is sufficient to alter the determination at block 225, were a vote available from the node 108-3.

TABLE 4

Example Votes and Outcome

| Node ID | Voting Weight | Vote | Outcome |
|---|---|---|---|
| 108-1 | 40% | Discard | 40/55 Discard |
| 108-2 | 15% | Approve | |
| 108-3 | 45% | N/A | |

The nodes 108-1 and 108-2 therefore proceed to block 245. At block 245, the nodes 108-1 and 108-2 are nevertheless configured to apply or discard the proposed update 500 according to the determination at block 225 (i.e. in the present example, the proposed update 500 is discarded). As shown in FIG. 5C, the local copies 112-1 and 112-2 remain unchanged. However, the proposed update 500 is maintained in the queue, along with the votes received at blocks 215 and 220. The nodes 108-1 and 108-2 can then be configured to continue processing further updates by returning to block 210. However, the nodes 108-1 and 108-2 also, in parallel with any such further proposed updates, proceed to block 250 to await a resolution for the uncertain outcome identified at block 240. The nature of the resolution is dependent on the vote generated by the node 108-3 itself, and will be discussed below in greater detail.

Figure 6:
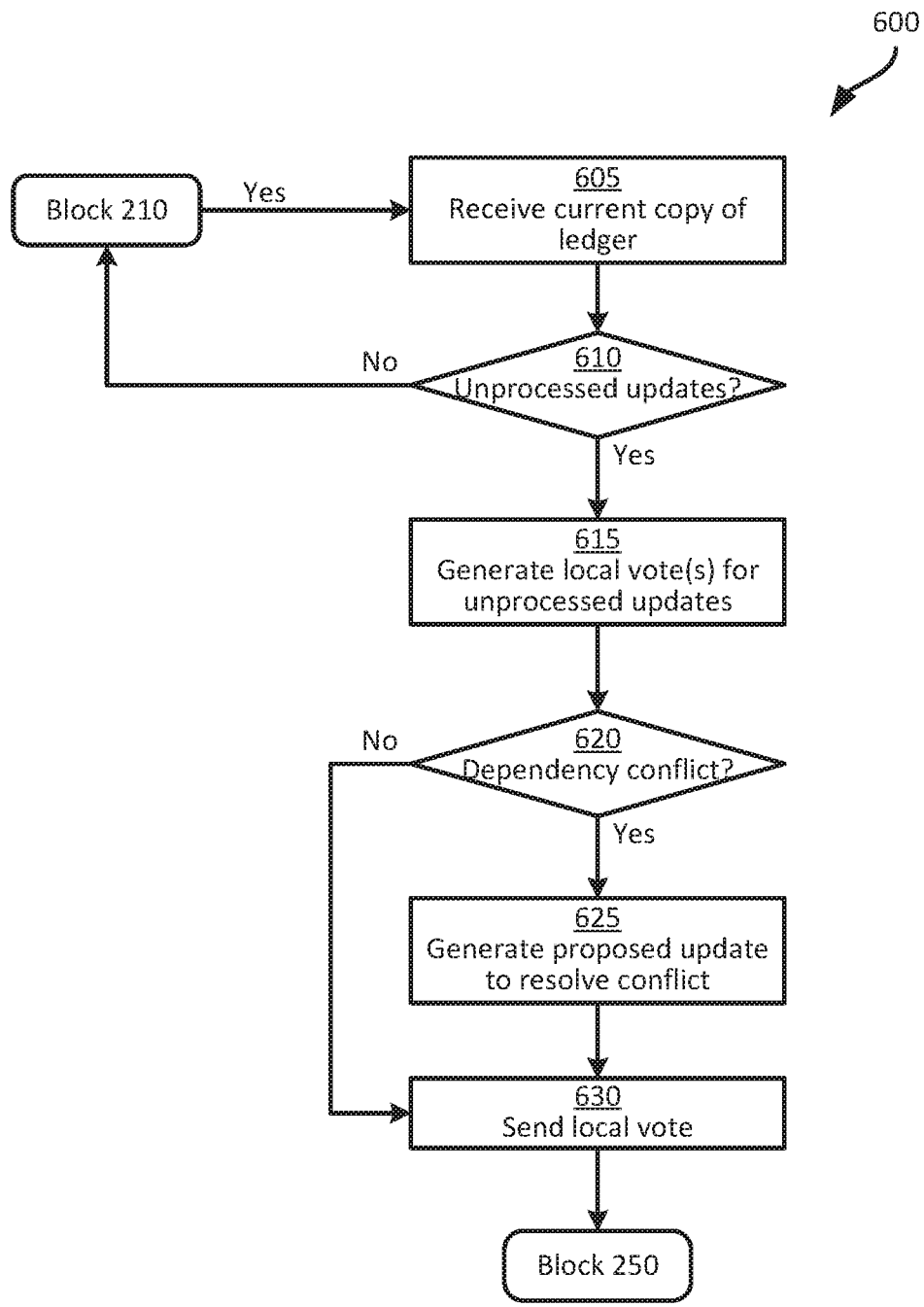
FIG. 6 depicts a method of recovering from an outage at one of the nodes in the system of FIG. 1

When the determination at block 210 is affirmative, indicating that a node 108 has had a recent outage (e.g. the node 108 may make the affirmative determination at block 210 responsive to re-establishing connectivity with the network 104), the node 108 proceeds to perform the method 600, shown in FIG. 6. Performance of the method 600, in brief, permits a node 108 having suffered an outage to recover any updates to the ledger 112 that occurred during the outage, and to determine whether to modify any of the above-mentioned updates via retroactive voting. That is, the method 600 permits a node 108 with sufficient voting weight to alter a previous update (i.e. with a voting weight sufficient to render a previous update uncertain) to re-evaluate the update and, if necessary, reverse the determination made at block 225 by the other nodes 108 in the absence of the present node's vote.

Continuing with the example above, in which the node 108-3 was disconnected from the network 104, at block 605 it is assumed that the node 108-3 has re-established connectivity with the network 104. The node 108-3 is configured, at block 605, to receive and apply updates made to the repository 112 during the outage. For example, the node 108-3 can transmit a request to the nodes 108-1 and 108-2 containing a timestamp of the most recent transaction in the local copy 112-3 of the ledger, or any other suitable data to indicate the time period during which the node 108-3 was offline. Responsive to such reconnection, the node 108-3 is configured to obtain an up-to-date copy of the ledger 112 for storage as the local copy 112-3. The local copy 112-3, therefore, is updated to include records of any updates that were proposed (whether accepted or discarded) during the period of time for which the node 108-3 was disconnected. Therefore, in the present example, although no updates were applied (as discussed above in connection with FIG. 5C), the current copy of the ledger 112 indicates that the proposed update 500 was evaluated and discarded while the node 108-3 was disconnected. The proposed update 500 is therefore also retained in the queues at each of the nodes 108-1 and 108-2.

At block 610, the node 108-3 is configured to determine whether the current copy of the ledger 112 (i.e. as now reflected in the local copy 112-3) contains any unprocessed updates, in the form of applied or discarded proposed updates that were voted on during the time period that the node 108-3 was disconnected. The determination at block 610 can include a determination of whether any such updates had uncertain outcomes. When the determination at block 610 is negative, indicating either that no unprocessed updates are present (i.e. that there was no activity in the ledger 112 during the time period for which the node 108-3 was disconnected) or that the only updates that occurred during the outage were not uncertain (i.e. cannot be changed by the vote of the node that suffered an outage), the performance of method 600 is complete, and the node 108-3 returns to block 210. When the determination at block 610 is affirmative, however, as in the example of the node 108-3 discussed above, the performance of the method 600 proceeds to block 615.

At block 615, the node 108-3 is configured to add each unprocessed update in the ledger 112 to a local queue, and to generate a local vote for each proposed update represented in the queue. The queue may be processed, for example, in chronological order, beginning with the oldest unprocessed update. That is, when the queue contains more than one proposed update (which, as will be evident from the discussion above, has in fact already been applied to the ledger 112 or discarded at the nodes 108-1 and 108-2), the node 108-3 is configured to generate local votes for each proposed update in the queue, beginning at the earliest (i.e. oldest) proposed update. The performance of the remaining portion of the method 600 is therefore repeated for each unprocessed update in the queue.

Responsive to generating a local vote for an unprocessed update, the node 108 having suffered an outage is configured, at block 620, to determine whether the local vote generated at block 615 relates to an unprocessed update upon which other unprocessed updates are dependent. As an example of a dependency conflict between unprocessed updates (i.e. those in the queue of the node 108-3), during the time period for which the node 108-3 was disconnected, a first update may be applied to the ledger 112 to insert a flight reservation for a given passenger, and a second update may be subsequently applied to the ledger to store a baggage check indicator for the flight reservation (e.g. indicating that the passenger has paid for one checked bag). The node 108-3 may be configured to determine, following a generation at block 615 of a local vote to discard the flight reservation, that the baggage check indicator is dependent upon the flight reservation. Simply transmitting a local vote to discard the flight reservation, in other words, may result in an inconsistency in the ledger 112, which would indicate a checked baggage payment for a non-existent flight reservation. In such a scenario, the determination at block 620 is affirmative.

Following an affirmative determination at block 620, at block 625 the node 108-3 is configured to generate a proposed update or other suitable action to resolve the conflict detected at block 620. For example, the node 108-3 can be configured to retrieve the unprocessed update conflicting with the current unprocessed update, and to generate a vote at block 615 for that update. Continuing with the example above, the node 108-3 may therefore be configured to generate a local vote for the baggage check record prior to sending the local vote for the flight reservation, effectively processing the conflicting updates in reverse chronological order. In other examples, the node 108-3 may be configured to generate a further proposed update for circulation among the nodes 108 and processing via the method 200 as discussed above. Certain conflicts detected at block 620 may require operator intervention to resolve, and the performance of block 625 may therefore include receiving input data defining a proposed update.

Responsive to generation of a proposed update at block 625 or a negative determination at block 620, at block 630 the node 108-3 is configured to send the local vote generated at block 615 (and, if applicable, any proposed updates or other actions generated at block 625) to the other nodes 108-1 and 108-3, for processing at block 250.

At block 250, each node 108 is configured to determine whether the previously missing vote (i.e. the local vote generated at block 615 by the node 108-3) changes the outcome currently reflected in the ledger 112 (i.e. the outcome arrived at via the earlier performance of block 225). When the determination at block 250 is negative, each node 108 proceeds to block 255, and removes the proposed update from the respective queue. Thus, if the node 108-3 generates a vote to discard the proposed update 500 at block 615, the determination at block 250 (as performed by each of the nodes 108-1, 108-2, 108-3, now that the full voting record is available) is negative, and each node 108 performs block 250, removing the proposed update 500 from their respective queues. The nodes 108 then return to block 210.

When, on the other hand, the determination at block 250 is affirmative, performance of the method 200 at each node 108 proceeds to block 260. For instance, if the node 108-3 generates a vote in favour of applying the proposed update 500 at block 615 (which is subsequently sent to the nodes 108-1 and 108-2 at block 630), the completed voting record corresponding to the proposed update 500 is as shown below in Table 5.

TABLE 5

Example Votes and Outcome

| Node ID | Voting Weight | Vote | Outcome |
| --- | --- | --- | --- |
| 108-1 | 40% | Discard | 60/100 Approve |
| 108-2 | 15% | Approve | |
| 108-3 | 45% | Approve | |

As seen above, with the addition of the vote generated at block 615 by the node 108-3, the outcome is altered from a decision to discard the proposed update 500, to a decision to approve (i.e. apply) the proposed update 500. The determination at block 250 being affirmative, each node 108 therefore performs block 260, at which the proposed update is re-applied (if it was discarded at block 225) or reverted (if it was applied at block 225).

In other words, at block 260 each node 108 is configured to reverse the outcome of the determination at block 225, as currently reflected in the ledger 112. Thus, in this example, in which the proposed update 500 was discarded (i.e. not applied to the ledger), at block 260 each of the nodes 108-1, 108-2 and 108-3 is configured to apply the proposed update 500 to the ledger 112. Alternatively, when the proposed update was previously applied, each node 108 is configured to apply the reverse of the update (e.g. when a seat assignment was applied to the ledger 112, each node 108 is configured to delete the seat assignment). The nodes 108 can be configured to perform the re-application independently. In other examples, the node 108-3 can be configured to transmit a re-evaluation or re-application instruction to the nodes 108-2 and 108-3 along with the local vote sent at block 630. The re-evaluation instruction contains the proposed update 500 as well as the complete voting record shown above in Table 5. In either implementation, the nodes 108-1 and 108-2 do not generate additional votes in connection with the re-evaluation of the proposed update 500. Instead, the votes previously generated at blocks 215 and 220 are employed. Referring to FIG. 2, at block 260, the nodes 108-1, 108-2 and 108-3 are therefore configured to apply the proposed update 500 to the ledger 112. The nodes 108-1, 108-2 and 108-3 are then configured to clear the proposed update 500 from their respective queues at block 255 and return to block 210.

Those skilled in the art will appreciate that in some embodiments, the functionality of the applications 140, 144, 148 and 152 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method of maintaining a distributed ledger at a client node, comprising:
   storing a distributed ledger defining a plurality of records each containing a set of values;
   storing (i) a local voting weight corresponding to the client node, and (ii) respective remote voting weights for a plurality of remote client nodes;
   obtaining a proposed update to a record of the distributed ledger;
   generating a local vote to apply or discard the proposed update and transmitting the local vote to the remote client nodes;
   receiving remote votes to apply or discard the proposed update at the client node, from the remote client nodes;
   at the client node, in response to receiving the remote votes, generating a weighted local vote according to the local voting weight, and generating weighted remote votes according to the remote voting weights;
   performing an initial determination of whether to permit the proposed update based on (i) the weighted local vote, and (ii) a subset of the weighted remote votes received before a timeout period;
   applying the proposed update to the distributed ledger or discarding the proposed update according to the initial determination;
   subsequent to the timeout period, determining whether to permit the proposed update based on (i) the weighted local vote, and (ii) the weighted remote votes; and
   according to the determination, re-applying or reversing the proposed update to the distributed ledger or discarding the proposed update.

2. The method of claim 1, wherein the proposed update is associated with a current one of a plurality of transaction types; the method further comprising:
   storing a plurality of further local voting weights, the local voting weight and the further local voting weights each corresponding to respective ones of the transaction types; and
   performing the determination based on one of the local voting weight and the further local voting weights corresponding to the current transaction type associated with the proposed update.

3. The method of claim 1, wherein the proposed update is associated with a current one of the set of values; the method further comprising:
   storing a plurality of further local voting weights, the local voting weight and the further local voting weights each corresponding to respective ones of the set of values; and
   performing the determination based on one of the local voting weight and the further local voting weights corresponding to the current value associated with the proposed update.

4. The method of claim 1, wherein obtaining the proposed update comprises generating the proposed update at the client node.

5. The method of claim 4, further comprising, responsive to generating the proposed update, transmitting the proposed update to the remote client nodes.

6. The method of claim 1, wherein obtaining the proposed update comprises receiving the proposed update from one of the remote client nodes.

7. The method of claim 1, wherein generating the local vote comprises retrieving private data distinct from the distributed ledger, and evaluating the proposed update based on the private data.

8. The method of claim 1, wherein generating the local vote further comprises:
   identifying a subset of the values affected by the proposed update; and
   based on the subset, determining whether to generate the local vote or a local blank vote.

9. The method of claim 1, further comprising:
   storing a proposed update queue;
   responsive to obtaining the proposed update, placing the proposed update in the queue for synchronization with the remote client nodes; and
   dequeuing the proposed update and determining whether to permit the proposed update responsive to receiving the remote votes from all of the remote clients.

10. The method of claim 9, further comprising:
    when a missing remote vote from one of the remote clients is not received within a timeout period, maintaining the proposed update, the local vote and received remote votes in the queue for subsequent synchronization to the one of the remote clients.

11. The method of claim 10, further comprising:
    prior to placing the proposed update in the queue, determining that the missing remote vote corresponds to a remote voting weight sufficient to alter the determination of whether to permit the proposed update.

12. The method of claim 10, further comprising:
    responsive to
    applying the proposed update to the distributed ledger or discarding the proposed update according to the initial determination, maintaining the proposed update in the queue; and
    responsive to receiving the missing remote vote, performing the determination of whether to permit the proposed update and, when the determination conflicts with the initial determination, reversing an outcome of the initial determination.

13. A computing device for implementing a client node of a distributed ledger, the computing device comprising:

a memory storing (i) a distributed ledger defining a plurality of records each containing a set of values; (ii) a local voting weight corresponding to the client node, and (iii) respective remote voting weights for a plurality of remote client nodes;

a processor connected to the memory, the processor configured to:

obtain a proposed update to a record of the distributed ledger;

generate a local vote to apply or discard the proposed update and transmitting the local vote to the remote client nodes;

receive remote votes to apply or discard the proposed update from the remote client nodes;

in response to receiving the remote votes, generating a weighted local vote according to the local voting weight, and generating weighted remote votes according to the remote voting weights;

perform an initial determination of whether to permit the proposed update based on (i) the weighted local vote, and (ii) a subset of the weighted remote votes received before a timeout period;

apply the proposed update to the distributed ledger or discarding the proposed update according to the initial determination;

subsequent to the timeout period, determine whether to permit the proposed update based on (i) the weighted local vote, and (ii) the weighted remote votes; and according to the determination, re-apply or reverse the proposed update to the distributed ledger or discarding the proposed update.

14. The computing device of claim 13, wherein the proposed update is associated with a current one of a plurality of transaction types; the processor further configured to:

store a plurality of further local voting weights in the memory, the local voting weight and the further local voting weights each corresponding to respective ones of the transaction types; and perform the determination based on one of the local voting weights and the further local voting weights corresponding to the current transaction type associated with the proposed update.

15. The computing device of claim 13, wherein the proposed update is associated with a current one of the set of values; the processor further configured to:

store a plurality of further local voting weights in the memory, the local voting weight and the further local voting weights each corresponding to respective ones of the set of values; and perform the determination based on one of the local voting weight and the further local voting weights corresponding to the current value associated with the proposed update.

16. The computing device of claim 13, wherein the processor is configured to obtain the proposed update by generating the proposed update.

17. The computing device of claim 16, wherein the processor is configured, responsive to generating the proposed update, to transmit the proposed update to the remote client nodes.

18. The computing device of claim 13, wherein the processor is configured to obtain the proposed update by receiving the proposed update from one of the remote client nodes.

19. The computing device of claim 13, wherein the processor is configured to generate the local vote by retrieving private data distinct from the distributed ledger, and evaluating the proposed update based on the private data.

20. The computing device of claim 13, wherein the processor is configured to generate the local vote further by:

identifying a subset of the values affected by the proposed update; and based on the subset, determining whether to generate the local vote or a local blank vote.

21. The computing device of claim 13, wherein the processor is further configured to:

store a proposed update queue in the memory;

responsive to obtaining the proposed update, place the proposed update in the queue for synchronization with the remote client nodes; and dequeue the proposed update and determining whether to permit the proposed update responsive to receiving the remote votes from all of the remote clients.

22. The computing device of claim 21, wherein the processor is further configured to:

when a missing remote vote from one of the remote clients is not received within a timeout period, maintain the proposed update, the local vote and received remote votes in the queue for subsequent synchronization to the one of the remote clients.

23. The computing device of claim 22, wherein the processor is further configured to:

prior to placing the proposed update in the queue, determine that the missing remote vote corresponds to a remote voting weight sufficient to alter the determination of whether to permit the proposed update.

24. The computing device of claim 22, wherein the processor is further configured to:

responsive to applying the proposed update to the distributed ledger or discarding the proposed update according to the initial determination, maintain the proposed update hi the queue; and responsive to receiving the missing remote vote, perform the determination of whether to permit the proposed update and, when the determination conflicts with the initial determination, reverse an outcome of the initial determination.

* * * * *